Sept. 30, 1969     L. A. FOY ET AL     3,469,520
VENT CAP
Filed Nov. 1, 1967
FIG. 3
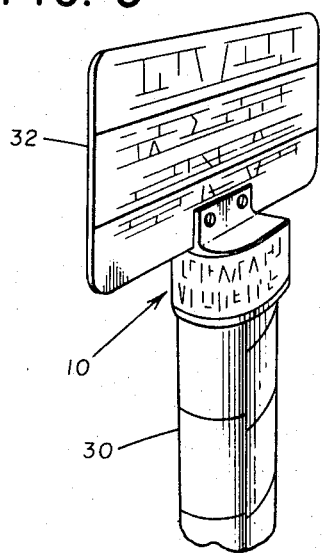
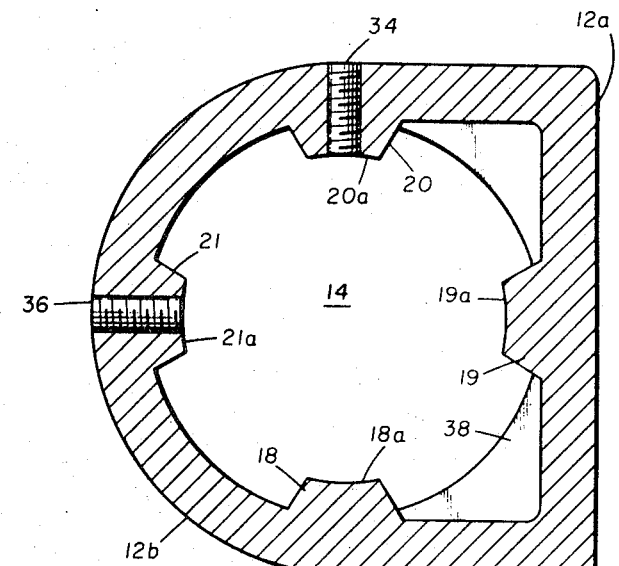
FIG. 2
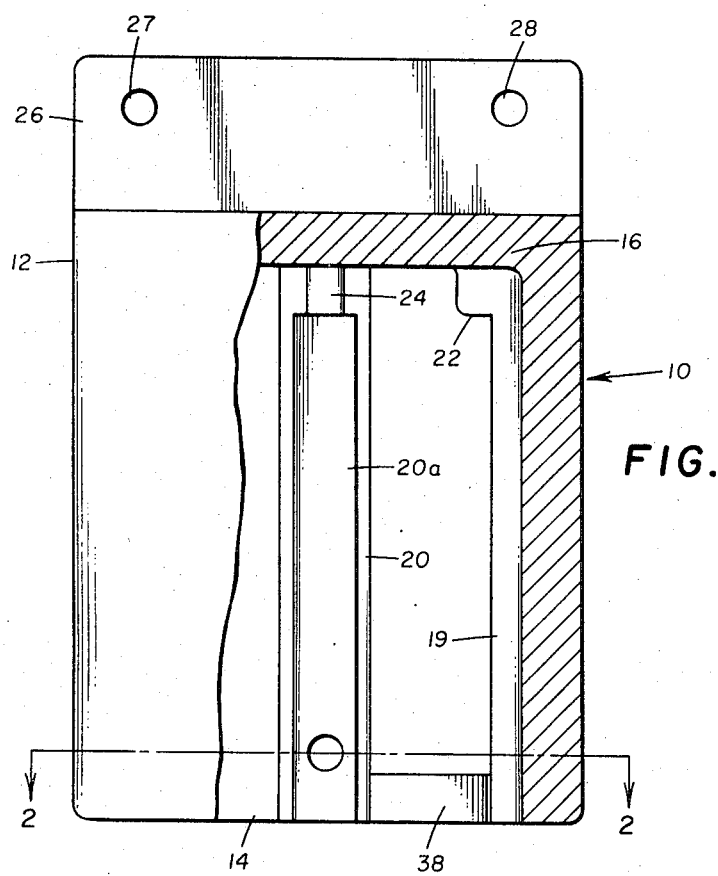
FIG. 1

United States Patent Office 3,469,520
Patented Sept. 30, 1969

3,469,520
VENT CAP
Leonard A. Foy, Dallas, and Thomas K. Provence, Jr., Wills Point, Tex., assignors to Mobil Oil Corporation, a corporation of New York
Filed Nov. 1, 1967, Ser. No. 679,857
Int. Cl. F23j 17/02
U.S. Cl. 98—122                                              4 Claims

ABSTRACT OF THE DISCLOSURE

This spesification discloses a vent cap which may be utilized to provide a mount for a display sign. The vent cap is in the form of a tubular housing having an open lower end and a closed upper end. The housing includes a plurality of ribs in the interior thereof which function as spacing elements. The ribs terminate in stop shoulders adjacent the closed upper end of the housing. A flange extends across the closed upper end of the housing and provides a bracket whereby a display sign may be secured to the vent cap.

BACKGROUND OF THE INVENTION

This invention relates to a new and improved vent cap, and more particularly to a vent cap which is especially suitable for use on a vent pipe such as the type associated with pipeline road crossings.

In road crossings for pipe lines such as those used for the transmission of petroleum fluids various problems are presented by line breaks with the resultant leakage of the transmitted fluid. Typically, when a leak develops in a pipe line below a roadbed, the oil or other fluid will seep upwardly through the roadbed and possibly cause a serious hazard to vehicular traffic. Similar hazards may be presented where the pipe line crosses other natural or man-made barriers. For example, at a stream crossing, a break in the pipe line beneath the streambed may result in water pollution with the resultant dangers to plant, animal and fish life.

In order to alleviate the hazards present in a pipeline road crossing, it is a conventional practice to enclose the line beneath the road with a protective casing. The casing typically, extends to several feet beyond the right-of-way on both sides of the road and is provided at each end with a bushing to seal the casing to the pipe line. Thus, the casing provides an enclosed protective chamber about the line underneath the roadbed. Should a leak develop in the line, the oil or other transmitted fluid will flow into this chamber where it is contained to prevent seepage upwardly through the roadbed with the attendant hazards. In order to avoid unduly high pressures within the casing and also to provide a visual indication of the leak, the casing is provided near the ends thereof with vertical vent pipes which extend upwardly through the surface of the earth. Each vent pipe is provided at its upper end with a vent cap which will allow the egress of fluids from the pipe but will retard the entry of foreign matter which may tend to plug the pipe. It also is desirable to provide a sign at the pipe-line crossing in order to indicate the presence of the pipe line to members of the public. Further, it is desirable to provide emergency information indicating to members of the public steps which should be taken in the event seepage from the vent pipe is noted.

SUMMARY OF THE INVENTION

In accordance with the present invention, there is provided a new and improved vent cap which is especially suitable for placement on a vent pipe such as the type associated with the above-described protective casings at pipe-line crossings. The vent cap provides a simple and effective structure which restricts entry of foreign matter and at the same time allows for the ready egress of fluid from the pipe should a leak develop. In addition, this vent cap provides a means of supporting a relatively large display sign at the pipe-line crossing.

The vent cap of the present invention comprises a tubular housing in the form of a truncated cylindriod and having an open lower end and a transverse closure member adjacent the upper end thereof. A plurality of peripherally positioned spacing elements are located in the interior of the housing and are offset from the inner wall thereof in order to space the housing from the outer surface of the vent pipe. In addition, at least one stop shoulder is provided in the interior of the housing adjacent the upper end thereof. The stop shoulder is offset from the inner wall of the housing by a distance greater than are the spacing elements in order to provide a clearance between the top of the vent pipe and the closure member of the cap. The housing is provided with a baffle member adjacent the lower end thereof which extends inwardly from the inner surface of the truncated portion of the housing. A mounting bracket is secured to the exterior of the housing and provides a means for attaching an enlarged display sign to the cap. The mounting bracket comprises an upstanding flange which is secured to the transverse closure member and lies in a plane extending through the truncated portion of the housing. Thus, the cap functions both as a support for a display sign and also to vent the pipe.

BRIEF DESCRIPTION OF THE DRAWINGS

FIGURE 1 is a side elevational view, partly in section, of a preferred embodiment of the present invention;

FIGURE 2 is a cross-sectional view taken along the line 2—2 of FIGURE 1; and

FIGURE 3 is a perspective view of the vent cap of the present invention showing it mounted on a pipe and supporting a display sign.

DESCRIPTION OF SPECIFIC EMBODIMENTS

With reference to FIGURES 1 and 2, there is shown a vent cap 10 which comprises a tubular housing 12. The housing 12 has an opening 14 at its lower end and is closed adjacent its upper end by means of a transverse closure member 16. For reasons described in detail hereinafter, in the preferred embodiment of the invention shown, the housing is in the form of a truncated cylindroid having a truncated wall portion generally indicated by reference numeral 12a and a cylindroid wall portion generally indicated by reference numeral 12b.

The housing 12 is provided with a plurality of spacing elements positioned peripherally about the interior of the housing and offset from the inner surface thereof. As shown in FIGURES 1 and 2, the spacing elements preferably take the form of peripherally spaced ribs 18, 19, 20, and 21 which extend along the inner wall of the housing. These ribs are provided with bearing surfaces 18a, 19a, 20a, and 21a which are offset from the inner wall of the housing such that when the housing is mounted on a vent pipe the inner surface of the housing is spaced from the outer surface of the vent pipe in order to provide flow passages for the egress of fluid from the pipe. As is best shown in FIGURE 1, the ribs preferably extend upwardly along the inner wall of the housing from a location adjacent the lower end thereof.

The interior of the housing 12 also is provided with a stop shoulder adjacent the upper end thereof which is offset from the inner wall of the housing by a distance greater than are the spacing elements in order to provide for a clearance between the top of the vent pipe and the transverse closure member 16. Desirably, a plurality of peripherally spaced stop shoulders are provided, each of which is positioned at the upper end of one of the aforementioned ribs 18, 19, 20, and 21. Thus, as shown in FIGURE 1, the ribs 19 and 20 terminate at their upper ends in stop shoulders 22 and 24, respectively. Although not shown in FIGURE 1, the ribs 18 and 21 also terminate in respective stop shoulders.

The vent cap of the present invention also is provided with a mounting bracket on the exterior of the housing in order to allow a display sign to be attached to the cap. In the preferred embodiment of the invention illustrated, the mounting bracket takes the form of an upstanding flange 26 which is attached to the transverse closure member 16. The flange 26 preferably lies in a plane extending through the truncated wall portion 12a of the housing 12 for reasons described hereinafter. The flange 26 is provided with holes 27 and 28 in order to allow a sign to be secured thereto by suitable fastening means.

Turning now to FIGURE 3, the vent cap 10 is shown attached to a vent pipe 30. A display sign 32 is attached to the cap 10 by means of the mounting flange 26. From an examination of FIGURE 3, it will be recognized that the cylindrical portion of the cap provides a surface on which easily readable emergency information may be inscribed. Thus, the cap 10 desirably is oriented on the pipe 30 such that the curved portion of the cap forms the "front" of the cap facing the road. The truncated wall portion is, of course, therefore faced away from the road. While the emergency information on the cap itself shoulder face the road, the display sign 32, which typically will contain information warning members of the public traveling along the road of the presence of the pipe-line crossing, preferably is oriented such that it lies in a vertical plane generally perpendicular to the direction of the road. Thus, the warning sign can be seen at a distance by travelers on the road as they approach the pipe-line crossing. For this reason, the upstanding flange which forms a mounting bracket for the sign should be oriented as shown such that it lies in a plane extending through the truncated back portion of the housing.

In order to ensure that the cap 10 and the sign 32 remain at the desired orientation with respect to the road, the housing is provided with means for securing the cap against movement relative to the pipe 30. More particularly, and as best shown in FIGURE 2, there are provided one or more set screws, such as those designated by reference numerals 34 and 36 which are threadably secured in the housing and adapted to be tightened into an abutting relationship with the outer surface of the pipe. Desirably, the set screws extend from the outer wall of the housing through spacing ribs as shown. By this arrangement an unnecessary obstruction in the flow passage between the inner surface of the housing and the outer surface of the pipe is avoided, and greater torque loads may be applied through the set screw due to the strength available in combined thicknesses of the housing and the rib.

While the cap may be secured against movement relative to the pipe by other means such as an external clamp, the set screw arrangement illustrated is preferred since it is relatively inexpensive and not readily discernible by casual passers-by. In this regard, after the cap is positioned on the pipe 30, the cap may be painted or the emergency information may be applied by means of a decal. Thus, the set screws may be obscured such that the cap is less subject to removal by unauthorized persons.

In order to provide a relatively small annular opening into the space between the outer surface of the vent pipe and the inner surface of the housing 12, the housing is provided at its lower end with a baffle member 38 which extends inwardly from the inner surface of the truncated wall portion 12a. As is best shown in FIGURE 1, the baffle member 38 cooperates with the opposed curved portion of the housing 12 to define a relatively small opening in the lower end of the housing through which the vent pipe extends. Thus, the cap effectively restricts the entry of foreign matter into the vent pipe.

Having described specific embodiments of the instant invention it will be understood that further modifications thereof may be suggested to those skilled in the art.

What is claimed is:

1. In a vent cap adapted to be mounted on a vent pipe, the combination comprising:
   a tubular housing in the form of a truncated cylindroid and having a transverse closure member adjacent the upper end thereof and an open lower end;
   a plurality of peripherally positioned spacing elements in the interior of said housing offset from the inner wall thereof to space the inner wall of said housing from the outer surface of a vent pipe on which said cap is adapted to be mounted;
   at least one stop shoulder in the interior of said housing located adjacent the upper end of said housing and offset from the inner wall thereof by a distance greater than said spacing elements;
   a baffle member adjacent the lower end of said housing and extending inwardly from the inner surface of the truncated portion of said housing; and
   a mounting bracket on the exterior of said housing for securing a display sign to said cap, said mounting bracket comprising an upstanding flange secured to said transverse closure member and lying in a plane extending through the truncated portion of said housing.

2. The combination of claim 1, further comprising means for securing said cap against movement relative to a vent pipe on which said cap is adapted to be mounted.

3. The combination of claim 1, wherein said spacing elements comprise a plurality of ribs which extend upwardly along the inner wall of said housing from a location adjacent the lower end thereof and terminate in a plurality of said stop shoulders.

4. The combination of claim 3, further comprising a set screw threadably secured in said housing and extending through said housing and one of said ribs from the outer wall of said housing to the inner surface of said one of said ribs whereby said cap may be secured against movement relative to a vent pipe on which said cap is adapted to be mounted.

References Cited

UNITED STATES PATENTS

| | | |
|---|---|---|
| 1,706,389 | 3/1929 | Bayliss. |
| 1,719,932 | 7/1929 | Holtson _____ 220—44 |
| 1,868,730 | 7/1932 | Dowrie _____ 220—44 |
| 2,601,820 | 7/1952 | Paul et al. _____ 138—89 X |
| 2,825,276 | 3/1958 | Porter _____ 98—122 |
| 3,031,783 | 5/1962 | Burke _____ 98—122 |

ROY D. FRAZIER, Primary Examiner

J. FRANKLIN FOSS, Assistant Examiner

U.S. Cl. X.R.

138—89; 220—44; 248—221